(12) United States Patent
Yao et al.

(10) Patent No.: US 12,491,436 B2
(45) Date of Patent: Dec. 9, 2025

(54) VIRTUAL ASSISTANT FOR GAME DISCOVERY

(71) Applicant: Sony Interactive Entertainment Inc., Tokyo (JP)

(72) Inventors: Chen Yao, Bloomingdale, IL (US); Jun Murakawa, Foster City, CA (US); Sagnik Chowdhury, San Jose, CA (US); Ratnakar Pawar, Redwood City, CA (US); Robert Brown, Lafayette, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 259 days.

(21) Appl. No.: 18/228,548

(22) Filed: Jul. 31, 2023

(65) Prior Publication Data
US 2025/0041724 A1 Feb. 6, 2025

(51) Int. Cl.
*A63F 13/5375* (2014.01)
*G10L 15/22* (2006.01)

(52) U.S. Cl.
CPC .......... *A63F 13/5375* (2014.09); *G10L 15/22* (2013.01)

(58) Field of Classification Search
CPC .... A63F 13/5375; A63F 13/215; A63F 13/67; G10L 15/22; G10L 13/00; G10L 13/033
See application file for complete search history.

(56) References Cited

U.S. PATENT DOCUMENTS

| | | |
|---|---|---|
| 6,352,479 B1 | 3/2002 | Sparks |
| 8,515,253 B2 | 8/2013 | Cottrell |
| 9,364,743 B2 | 6/2016 | Miura et al. |
| 9,457,264 B1 | 10/2016 | Chyou et al. |
| 9,630,097 B2 | 4/2017 | Paradise et al. |
| 9,782,678 B2 | 10/2017 | Long et al. |
| 10,335,690 B2 | 7/2019 | Schleicher |
| 10,456,680 B2 | 10/2019 | Miron et al. |
| 11,071,910 B1 | 7/2021 | Landers et al. |
| 11,338,210 B2 | 5/2022 | Benedetto et al. |
| 12,045,638 B1* | 7/2024 | Gu ................... G06F 9/453 |
| 2001/0016510 A1 | 8/2001 | Ishikawa et al. |
| 2006/0046234 A1 | 3/2006 | Sperry |

(Continued)

FOREIGN PATENT DOCUMENTS

| WO | 2014100770 A2 | 6/2014 |
|---|---|---|
| WO | 2019182680 A1 | 9/2019 |
| WO | 2021156848 A1 | 8/2021 |

OTHER PUBLICATIONS

U.S. Appl. No. 18/208,159 to Rathish Krishnan et al. filed Jun. 9, 2023.

(Continued)

*Primary Examiner* — James S. McClellan
(74) *Attorney, Agent, or Firm* — Kilpatrick Townsend Stockton LLP (57) ABSTRACT

A device, system, and non-transitory computer readable medium for providing a specialized agent comprising an application and a virtual assistant are disclosed. The virtual assistant includes a neural network trained with a machine learning algorithm to emulate a communication style of a character and wherein the virtual assistant is further trained on application metadata to a predict response to questions about the application.

25 Claims, 9 Drawing Sheets

(56) References Cited

U.S. PATENT DOCUMENTS

| | | |
|---|---|---|
| 2011/0246621 A1 | 10/2011 | May et al. |
| 2011/0269540 A1 | 11/2011 | Gillo et al. |
| 2012/0202594 A1 | 8/2012 | Bistis et al. |
| 2013/0079134 A1 | 3/2013 | Walker et al. |
| 2013/0249947 A1 | 9/2013 | Reitan |
| 2013/0260894 A1 | 10/2013 | Graf et al. |
| 2014/0038701 A1 | 2/2014 | Allen et al. |
| 2014/0162780 A1 | 6/2014 | Suzuki |
| 2014/0258469 A1 | 9/2014 | Maharajh et al. |
| 2014/0278686 A1 | 9/2014 | Mullings et al. |
| 2015/0157938 A1 | 6/2015 | Domansky et al. |
| 2015/0231502 A1 | 8/2015 | Allen et al. |
| 2016/0255409 A1 | 9/2016 | Feldstein et al. |
| 2017/0064014 A1 | 3/2017 | Nomura |
| 2017/0087460 A1 | 3/2017 | Perry |
| 2017/0259177 A1 | 9/2017 | Aghdaie et al. |
| 2018/0365935 A1 | 12/2018 | Howell et al. |
| 2020/0061465 A1 | 2/2020 | Benedetto et al. |
| 2020/0122031 A1 | 4/2020 | Sherwani et al. |
| 2020/0139245 A1 | 5/2020 | Jarzebinski |
| 2020/0289932 A1 | 9/2020 | Benedetto et al. |
| 2021/0038998 A1 | 2/2021 | Tallarico et al. |
| 2021/0086089 A1 | 3/2021 | Pardeshi et al. |
| 2021/0146241 A1 | 5/2021 | Bleasdale-Shepherd et al. |
| 2021/0151034 A1 | 5/2021 | Hasan et al. |
| 2021/0173548 A1 | 6/2021 | Brown et al. |
| 2021/0213353 A1 | 7/2021 | Berg et al. |
| 2021/0370183 A1 | 12/2021 | Dorn et al. |
| 2022/0019744 A1 | 1/2022 | Yu et al. |
| 2022/0096937 A1 | 3/2022 | Dorn et al. |
| 2023/0031521 A1 | 2/2023 | Anders et al. |
| 2023/0078380 A1 | 3/2023 | Zaghetto et al. |
| 2023/0206574 A1 | 6/2023 | Whitney et al. |
| 2023/0376328 A1* | 11/2023 | Nagar ................ G10L 21/003 |
| 2024/0036636 A1* | 2/2024 | Press ................ G02B 30/56 |
| 2024/0202285 A1* | 6/2024 | Dechu ................ G06F 40/35 |
| 2024/0289686 A1* | 8/2024 | Desgarennes .......... G06N 3/006 |
| 2024/0290329 A1* | 8/2024 | Dasher ................ G10L 15/30 |
| 2024/0412030 A1* | 12/2024 | Guinn ................ G06N 3/045 |
| 2025/0036889 A1* | 1/2025 | Fu ................ G06T 13/205 |

OTHER PUBLICATIONS

U.S. Appl. No. 18/208,166 to Chen Yao et al. filed Jun. 9, 2023.
U.S. Appl. No. 18/208,179 to Chen Yao et al. filed Jun. 9, 2023.
International Search Report and Written Opinion for International Application No. PCT/US2024/030758, dated Aug. 15, 2024.
International Search Report dated Aug. 13, 2024 for International Patent Application No. PCT/US2024/030760.
Clark et al. "ELECTRA: Pre-training Text Encoders as Discriminators Rather Than Generators" ArXiv abs/2003. 10555, 2020.
D. Sasirekha et al. "Text to Speech: A simple Tutorial" Int. J. of Sort Computing and Eng. (IJSCE) vol. 2 Iss. 1 Mar. 2012 ISSN: 2231-2307.
Dutoit, Thierry "High Quality Text to Speech Synthesis: An Overview" Faculte Polyechnique de Mons, TCTS lab, 1997.
Fuzhen Zhuang et al. "A Comprehensive Survey on Transfer Learning" In Proceedings of the IEEE, vol. 109, No. 1, pp. 43-76, Jan. 2021.
Hochreiter & Schmidhuber "Long Short-term memory" Neural Computation 9(8):1735-1780 (1997).
Nadkarni et al. "Natural Language Processing: an introduction" J. Am. Med. Assoc. 2011; 18:544-551 accessed Jun. 27, 2023.
Radford et al. "Improving Language Understanding by Generative Pre-training" Open AI, Jun. 2018.
Vaswani, Ashish; Shazeer, Noam; Parmar, Niki; Uszkoreit, Jakob; Jones, Llion; Gomez, Aidan N.; Kaiser, Lukasz; Polosukhin, Illia (Dec. 5, 2017). "Attention Is All You Need". arXiv:1706.03762.

* cited by examiner

VIRTUAL ASSISTANT FOR GAME DISCOVERY

FIELD OF THE DISCLOSURE

Aspects of the present disclosure relate to providing virtual help, specifically aspects of the present disclosure relate to providing a customized virtual help agent for an application.

BACKGROUND OF THE DISCLOSURE

Literature, movies, videogames, and other media have created many memorable characters. These characters often have unique personalities, mannerisms, and speech patterns. Sadly, people can generally only experience these memorable characters in the medium in which they were originally created. Some places such as theme parks allow people to experience characters using entertainers who are trained to imitate the character and dress up like the character. It would be more entertaining and exciting if people were able to interact with their favorite characters without having to go to theme parks.

While operating applications users often have questions or need help. It can be daunting for users to have to read a manual or look up help online. Players may prefer to have an answer to their problem explained by a friendly face. Additionally, in the sales context people are often more likely to make a purchase when they can communicate with a salesperson.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the disclosure. Accordingly, examples of embodiments of the present disclosure described below are set forth without any loss of generality to, and without imposing limitations upon, the claimed implementations.

Movies, books, radio plays, short stories, and video games provide unique characters with personalities and traits. These sources of unique characters may provide a large amount of data which may be leveraged in training generative systems to replicate the characters. Generative machine learning systems allow the creation of unique responses to questions. Additionally, Generative machine learning systems may be connected to databases to query answers to questions or trained on a corpus of data that includes answers to questions users of the generative machine learning system may ask. In this way a help system may be created that provides a user with useful information in a unique and interesting way, using the familiar personality of a character.

Figure 1:
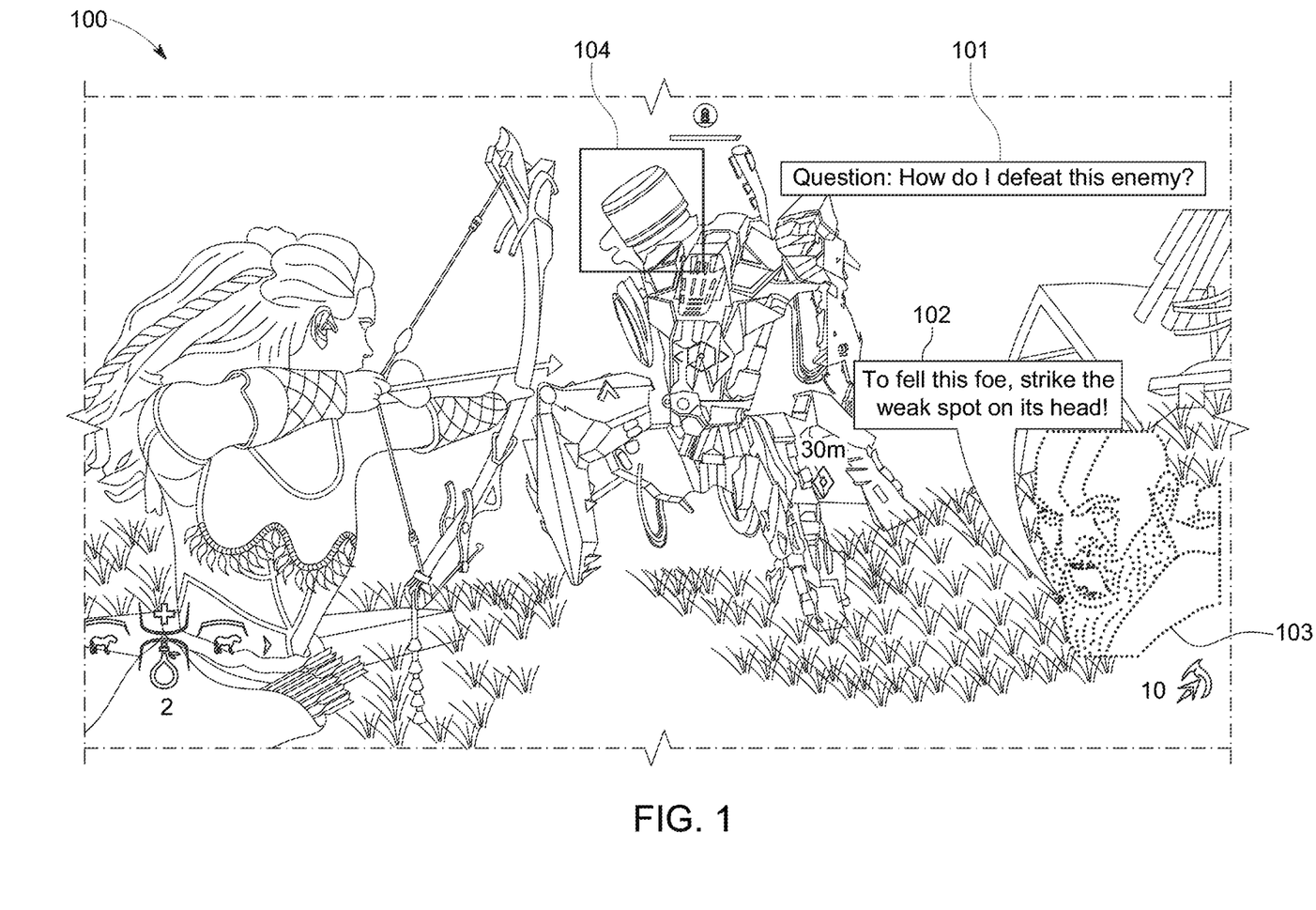
FIG. 1 is a screenshot of an example implementation of a virtual assistant according to aspects of the present disclosure.

FIG. 1 is a simulated screenshot of an example implementation of a virtual assistant according to aspects of the present disclosure. Here, the screenshot 100 is of a videogame application displayed on a screen of the system. Dialog box 101 is displayed on the screen where a user may enter a question or comment for the virtual assistant. The virtual assistant 103 is displayed as an animated headshot of a character near a corner of the screen. The virtual assistant 103 is a Viking type character from a different application that has a gruff and more old-style English way of talking. The user asks the virtual assistant how to defeat the enemy within the scene, e.g., via text or speech-to-text input. Virtual assistant 103 responds with instructions 102 on how to defeat the enemy in the voice of the character. Additionally, the virtual assistant is integrated with the game allowing a box 104 showing the enemy's weak area to be displayed around the enemy on screen.

Creation of this virtual assistant may use the integration of several different components within the system to generate a representation of a character that also provides assistance to the user. First a virtual assistant may include a neural network trained with a machine learning algorithm to replicate a character. As will be discussed in a later section, the neural network may be trained with a machine learning algorithm on a corpus including one or more of games, movies, webpages, and literary data that include the character to be replicated. Replicating the character may include, for example and without limitation simulation of the style of phraseology, diction, slang, and symbolism used by the character. In some implementations, the neural network may use contextual information to frame responses. By utilizing a virtual assistant trained with machine learning with a diverse data corpus that includes the character to be replicated, one can simulate the unique stylistic aspects of character behavior with a virtual assistant. Here the replication of the character allows the character's manner of speaking in text to be expressed in new situations not found in the corpus of data. A natural language processing module may be used to convert the text questions from the user into a machine-readable form and generate a vector representing the question which can be provided to the virtual assistant.

The virtual assistant may further be trained on data corresponding answers to questions about an application or other data sources.

The virtual assistant could be trained on a wide variety of questions and data. These may include application-specific questions. For example, if the virtual assistant is designed for a specific video game, it could be trained on questions related to game mechanics, story elements, character backstory, best strategies, controls, and so forth. The agent may also be trained to handle general gaming inquiries such as "Which game genre might I enjoy based on my provided preferences?" or "What are some top-rated games in this genre?" Additionally, the virtual assistant may be trained to answer questions related to trivia and lore. For games with complex backstories and universes, the agent could answer questions on in-game lore, character histories, game world geography, and more. For example, in a game like World of Warcraft, the agent could answer detailed questions about the game's intricate lore.

In some implementations, the virtual assistant may further be trained to provide help during an in-game activity. By way of example, a player could ask how to use an available in-game item, e.g., in a particular activity. Alternatively, the player could ask for information regarding a particular character in a game and their relationship to the player's character.

In some implementations, the machine-readable text may be provided to a search module connected to a database. The search module may search the database for a response to the text and, if found, may provide the response from the database to the virtual assistant. The virtual assistant in turn may replicate the character using the response. A character module may put a visual representation to the response generated by the virtual assistant. The character module may include animations and/or images of the character. For example and without limitation, the character module may have a database of speaking animations for the character. In some implementations the character module may include a neural network trained with a machine learning algorithm to create custom images of the character. Training of the character neural network may use images of the character from the corpus of training data. Finally, a text-to-speech module may be used to convert the text output of the virtual assistant to sound data which may be played through a speaker. The text to speech module may include a database of audio samples of the voice of the character. In some implementations a machine learning technique such as a Hidden Markov Model or Deep Learning Neural network may be developed or trained to model and synthesize speech using the audio samples. The text to speech module may be operable to replicate a speech style of the character. The speech style of the character may include one or more of a group of intonation, speed, pronunciation, and prosody.

Figure 2:
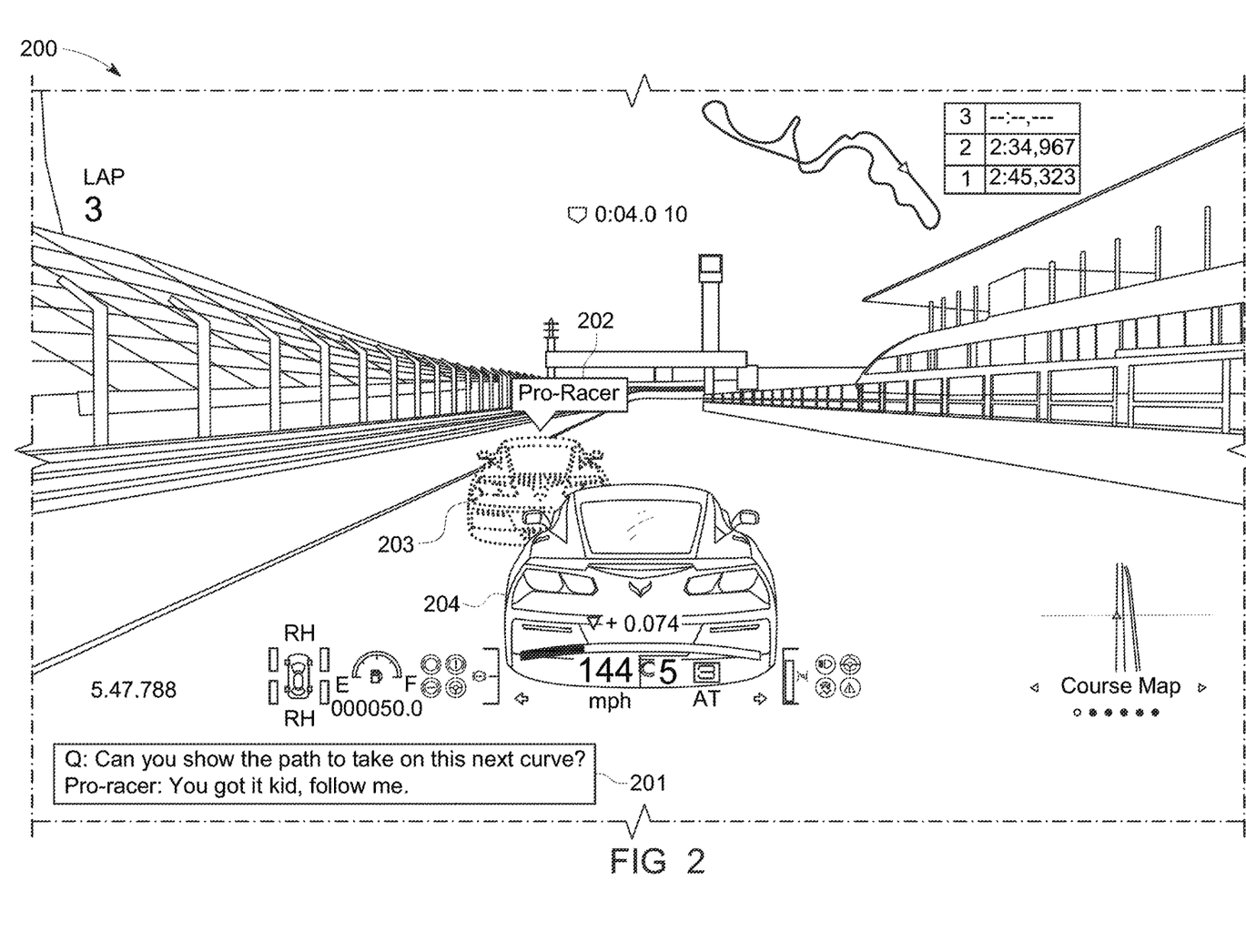
FIG. 2 is a screenshot of an example implementation of a virtual assistant with gameplay module according to aspects of the present disclosure.

FIG. 2 is a simulated screenshot of an example implementation of a virtual assistant with gameplay module according to aspects of the present disclosure. In the example implementation shown the dialog 201 with the user is evaluated by a natural language processing module and the contents trigger a game play module. The gameplay module may be operable to operate the application 200. Here a video module is operable to operate in tandem with the application to display the virtual assistant 203 as a custom car for the character. The virtual assistant responds with dialog 201 replicating the way the character might respond to the dialog. While the gameplay module is operating the virtual assistant may monitor the game state and periodically make comments about the progression of the game. For example and without limitation, if the car of the virtual assistant 203 is passed by the player 204 the virtual assistant may respond with a short statement like "Good Job!" or "Get Back Here!" The character module in conjunction with the application may display a tag 202 over the visual representation of the character. In this way the virtual assistant may be able to operate an application with the user or show the user how to perform operations within the application. The application may for example and without limitation be a game, a learning application, a word processor, a spreadsheet program, a storefront application, or a multimedia player. In implementations where the application is a storefront, the virtual assistant may receive information about the products in the store front or be trained on product data and provide responses about the products replicating the style of the character.

Figure 3:
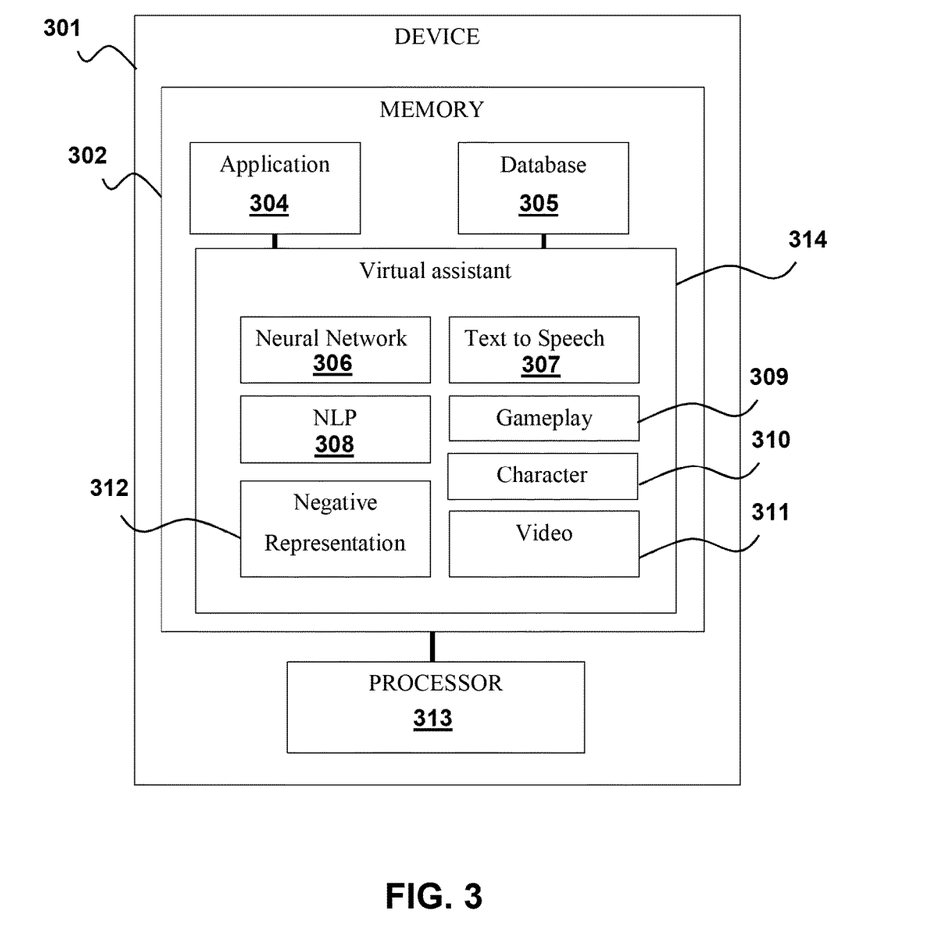
FIG. 3 is a block diagram showing a device implementing a virtual agent according to aspects of the present disclosure.

FIG. 3 is a block diagram showing a device implementing a virtual agent according to aspects of the present disclosure. The device as shown may include one or more processors 313 and a memory 302. The one or more processors may include one or more central processor units and/or one or more graphics processors. The memory may be implemented as Random Access Memory (RAM) or Read Only Memory (ROM) or a computer readable medium. The memory may include instructions that cause the processor to implement a virtual assistant 314. Additionally, the memory may include instructions for the implementation of an application 304 with the processor and/or a database 305 that includes information regarding the application.

The virtual assistant 314 may include one or more neural networks 306 trained with a machine learning algorithm to replicate a character. In some implementations the neural networks may be trained to replicate two or more different characters and the user may be given the choice between different characters. Additionally, the virtual assistant may utilize specialized modules such as a text to speech module 307, Natural Language Processing (NLP) 308, gameplay module 309, character module 310, video module 311 and/or negative representation module 312.

The virtual assistant 314 may receive data from the application 304 and/or database 305. For example, the virtual assistant may receive application state information that may be used to determine a context surrounding a question posed by a user. Application state information may also be provide periodic updates for the players operation of the application allowing the virtual assistant to periodically generate comments based on the application state. The database may include a search algorithm and may receive information regarding a query from the NLP module and return answer data to the virtual assistant.

The text to speech module 307 may be operable with sufficient programming to output synthesized speech data from an output of the virtual assistant neural network 306. The text to speech module causes the processor to carry out the steps of phonetic encoding which maps the words provided by the virtual assistant neural network to phoneme using phonetic rules and a phonetic dictionary. The phonemes may then be passed through speech modeling which captures the stress pattern, speed, pronunciation rhythm and intonation of speech. This may be performed by a speech neural network trained with a machine learning algorithm to determine stress pattern, speed, pronunciation rhythm and intonation of speech. Additionally, this neural network may be trained on the corpus of character data to replicate the speech style of the character. In some implementations, the speech neural network may be trained with a machine learning algorithm on voice recordings.

Once the speech modeling is completed the speech may be synthesized by for example and without limitation concatenative synthesis or formant synthesis. Concatenative synthesis uses prerecorded voices from the database which may be available from the corpus of character data. In other implementation the prerecorded voices for the character are not available and generic recordings of voices may be used. Alternatively, Formant-synthesized voices which uses manipulation of audio waveforms to create phonemes may be used which have characteristics that are chosen to simulate the voice of the character, or a voice archetype related to an archetype of the character. For example, the character may have the archetype of a fighter and the certain voice characteristics that correspond to the archetype of fighter may be used to simulate the character's voice. The audio wave forms may further be post-processed to smooth between phoneme waveforms or recorded voice segments, add intonation, normalize sound amplitude between sample or phoneme waveforms, etc.

The NLP module 308 converts text entered by the user into a machine-readable form. The NLP module may tokenize strings entered by the user and recognize key words and/or phrases. Tokenizing the strings entered by the user may include the tasks of sentence boundary detection, recognizing individual tokens (words, punctuation, symbols, etc.) and parsing sentences into phrases. Recognizing key words may include recognizing question words, places, exclamations, etc. The NLP module may draw from the database 305 for words and phrases related to one or more applications 304. Database 305 may contain dictionaries containing words and/or phrases related to one or more applications 304, which may be used as a data source for the NLP module. Additionally, the NLP module may include one or more machine learning techniques in recognition of key words. For example, the NLP module may utilize neural networks, support vector machines, or Hidden Markov models trained with machine learning algorithms. The NLP module may provide machine-readable text to the virtual assistant neural network 306.

The gameplay module 309 may be operable with sufficient programming to provide inputs to the one or more applications 304, allowing the virtual assistant to operate the application. In some implementations, the application 304 may be operable to allow the gameplay module 309 to operate in tandem with the user. In implementations where the application 304 is a cooperative game, the gameplay module 309 may be operable to play cooperatively with the user.

In some implementations, the gameplay module 309 may generate scripts or commands that are executed in response to changes in game state. The system that implements the virtual assistant might be designed to interpret the game state. By way of example, and not by way of limitation, the game state could include information about the user's actions, in-game events or environment changes, AI behavior, and more. The virtual assistant may then use these inputs to inform its own actions. This continuous process of receiving game state inputs, interpreting them, and then generating scripts to interact with the game application allows the gameplay module to function as an effective in-game agent, working in tandem with the user or independently. This concept also enables the potential for cooperative play, where the gameplay module and the user continue to interact and cooperate to meet common game objectives.

As an example, consider a situation in which the gameplay module 309 is provided with a game wiki that it uses to produce answers to player's questions. The game wiki includes a corpus of data that details activities, plot, characters, and other information relevant to the game. If the player asks the virtual assistant how to solve a particular problem the gameplay module 309 may fetch a correct knowledge excerpt related to the question from the wiki. The excerpt may then submit the excerpt to a large language model with a prompt to use the excerpt to answer the player's question. The large language model responds and the response is presented to the player.

In some implementations the gameplay module may enable a simple AI actor built into the application. The gameplay module may be operable to operate with an application such that the application labels the simple AI actor as being the virtual assistant. In an alternative implementation the gameplay module may include a neural network trained with a machine learning algorithm to enter inputs into the application and operate the application from application state updates. The gameplay module may further monitor application state updates provided by the one or more applications 304. For example, and without limitation, the application state data may indicate to the gameplay module that the application is a racing game. In such a case the gameplay module may activate a neural network trained to play racing game applications. The game play neural network may be trained generally on a given type of application (e.g., racing game, shooter, puzzle, learning game etc.) or there may be a separate neural network for each application, where each separate neural network is specifically trained to operate that application from application state updates.

The Character Module 310 may be operable with sufficient programming to display a visual representation of the character. The character module may include a database of images of one or more characters which may be replicated by the virtual assistant. The images may include characters in different orientations, positions and with different facial expressions. Additionally in some implementations the character module may also have animations of the character. For example and without limitation, the character module may include animations of the character talking and moving their head. The character module may send visual representation data of the character to the processor where it may be rendered, and the rendered images may be sent to a display. In some implementations the character module may provide overlay information to the processor, instructing the processor to overlay the visual representation of the character over image frames from the application. The overlay information may provide a location and size for the visual representation of the character in the overlay. The overlay may be customizable by the user allowing the user to choose a size, and or location on the display of the visual representation. For example, the character module 310 may be operable to allow the user to customize appearance, voice, and other attributes, e.g., clothing, of the character. In addition, the character module 310 may be operable to portray the character's emotion dynamically based on the context of conversation. The emotion could be displayed as facial expressions, body language, gestures, and the like. Furthermore, the character module may be operable to offer options for closed captions, sign language, etc.

The character module may additionally be synchronized with the output of the virtual assistant neural network such that the visual representation of the character appears on the screen simultaneously with a response from the virtual assistant neural network. The character module may further be responsible for generation of display of the response from the virtual assistant neural network. For example, the character module may generate visual data for the display of the response generated by virtual assistant neural network. Additionally, in implementations with an animated visual representation the animations of the visual representation may be timed to coincide with display of a text response from the virtual assistant neural network or sound from the text to speech module.

The Video Module 311 may be operable with sufficient programming to provide video based on the response from the virtual assistant neural network 306. The video module may include a database of videos organized by key words and/or phrases. The video module may pull video data from the database of videos when the key words and/or phrases are detected in the response from the virtual assistant neural network. The video data may further be sent to the display. Additionally, the video module may instruct the processor to overlay the video and/or text and/or graphic content on top of image frames of the application. In some alternative implementations that video module may search a remote video database for keywords and/or phrases detected in the response from the virtual assistant neural network 306.

The negative representation module 312 may be operable with sufficient programming to censor responses from the virtual assistant neural network 306 that are inappropriate, spoil portions of the application, and/or make illegal statements. The negative representation module may include a negative representation neural network trained with machine learning algorithms to detect inappropriate responses from responses generated by the virtual assistant neural network 306. Additionally, the negative representation module neural network may be trained to recognize legally problematic statements. Finally in some implementations the negative representation module includes spoiler prevention. Spoiler prevention may receive application state data and use the application state data to track progress of the user in the application. The negative representation module may also include a spoilers table of key words and/or phrases that are indexed by application state data. When a key word or phrase in the response from the virtual assistant neural network is detected that does not match the current application state the key word or phrase may be removed. A replacement phrase may be chosen from a table of replacement phrases indicating that the question or response was inappropriate, a spoiler or legally problematic. For example and without limitation, a response from the virtual assistant neural network may reference the name of an item from the application and the spoilers table may indicate that the application state where the item occurs has not been met (e.g. the item entry found in the table does not match the current application state) as such the negative representation module may replace the response generated by the virtual assistant neural network with a replacement statement such as "no spoilers" or "I can't tell you yet." In some implementations a key statement input to the virtual assistant 314 by the user such as "spoil it for me" or "just tell me already" may suspend operation of the negative representation module for the previous statement and provide the response generated by the virtual assistant neural network to the user. If the response is inappropriate or legally problematic the key statement may not suspend operation of the negative representation module. In an alternative implementation instead of generating a replacement response the virtual assistant neural network may be forced to generate a different answer to the user prompt.

The virtual assistant neural network 306 in some implementations may be a generative language model trained with a corpus of character information to produce text that replicates a character. In some implementations the virtual assistant neural network 306 man include one or more neural networks trained to replicate multiple different characters. In some alternative implementations there may be multiple virtual assistant neural networks, each customized to replicate a different character. The virtual assistant neural network 306 or networks may initially be based on a pretrained model which may then be customized through transfer learning to produce text that replicates a character. Examples of pretrained models that may be used for transfer learning include Generative Pretrained Transformer (GPT), Bidirectional Encoder Representation from Transformers (BERT), or Efficiently Learning an Encoder that Classifies Token Replacement Accurately (ELECTRA). These pretrained models may then be refined with transfer learning. The transfer learning may use the corpus of character information to refine the pretrained model to respond like the character might to questions. The transfer learning may further impart application specific knowledge to the model. In unsupervised training virtual assistant neural network may be tasked with generating the next token in a sequence of tokens (E.g., generating the next word in a sentence or letter in word.). For more information on transfer learning, see Fuzhen Zhuang et al. "A Comprehensive Survey on Transfer Learning" *In Proceedings of the IEEE*, vol. 109, no. 1, pp. 43-76, January 2021 which herein is incorporated by reference. For more information on Generative models see: Radford et al. "Improving Language Understanding by Generative Pre-training" Open AI, (2018) and Clark et al. "ELECTRA: Pre-training Text Encoders as Discriminators Rather Than Generators" ArXiv abs/2003. 10555, (2020), both of which are incorporated herein by reference. In some alternative implementations the neural network or networks may be trained de novo with semi supervised techniques and may have a transformer type architecture. The trained neural network may then be further customized with the corpus of character data to simulate a response style of one or more characters.

Figure 4:
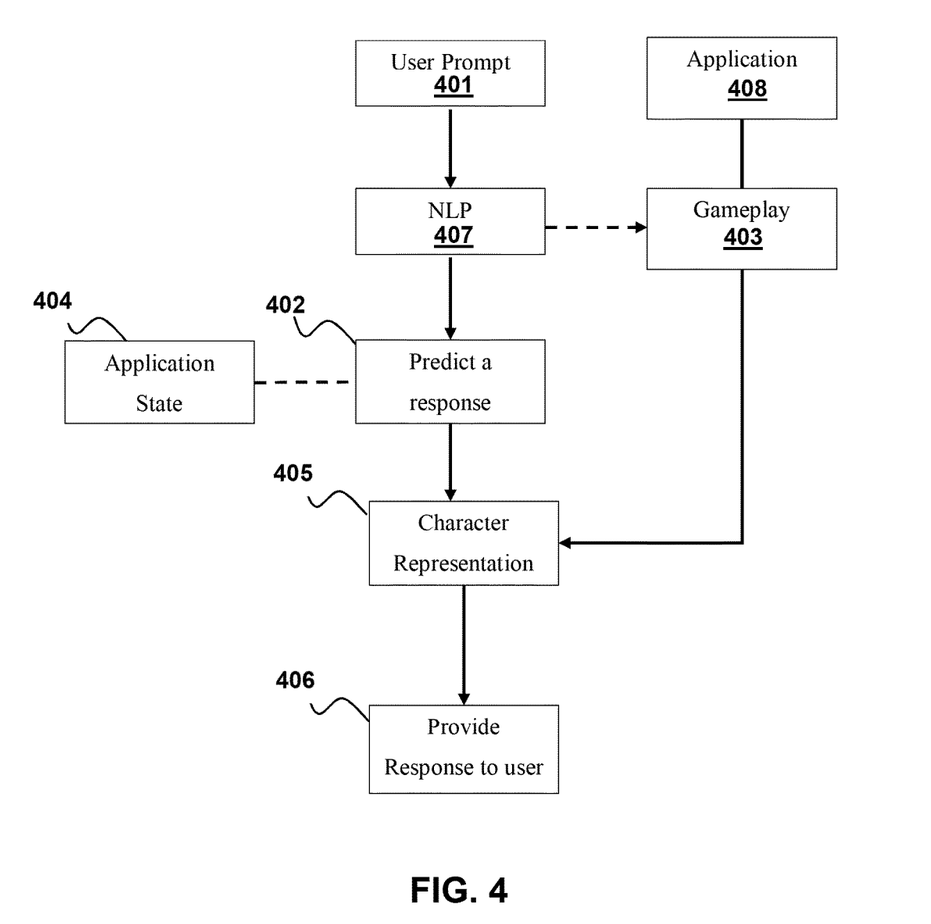
FIG. 4 is a flow diagram depicting a method of operation replicating a character with optional application operation capability according to aspects of the present disclosure.

FIG. 4 is a flow diagram depicting a method of operation replicating a character with optional application operation capability according to aspects of the present disclosure. Initially, the user may enter a prompt 401 into the system. The prompt may be a text string that is for example and without limitation entered into a text box or some other field in the system. In an alternative implementation voice recognition may be used to convert a prompt voiced by a user into a text prompt. A prompt may be for example and without limitation a question or statement by the user intended to incite a response from the system. NLP 407 then evaluates the prompt. NLP tokenizes the prompt and performs some keyword recognition tasks on the prompt. Keywords from the prompt may be detected by the gameplay module 403 and initiate the gameplay with the application 408. Simultaneously the virtual assistant neural network takes the tokenized prompt and key words and predicts a response 402 that replicates a response a character might produce. The prediction of the response may use application state data 404 from the application 408 to craft an appropriate and/or customized response. Once the response has been generated, it may be provided to the character module which may cause the generated response to be shown on a display 406. The character module may also generate a visual representation 405 of the character with the response that is subsequently displayed 406. Additionally, when the gameplay module 403 is active, the operation of the application may be customized by the character module to present the operations being performed with the gameplay modules as being performed by the character. For example and without limitation, the character module may provide a label in an overlay of image frames of the application showing an AI entity as being the character as shown in FIG. 2.

Figure 5:
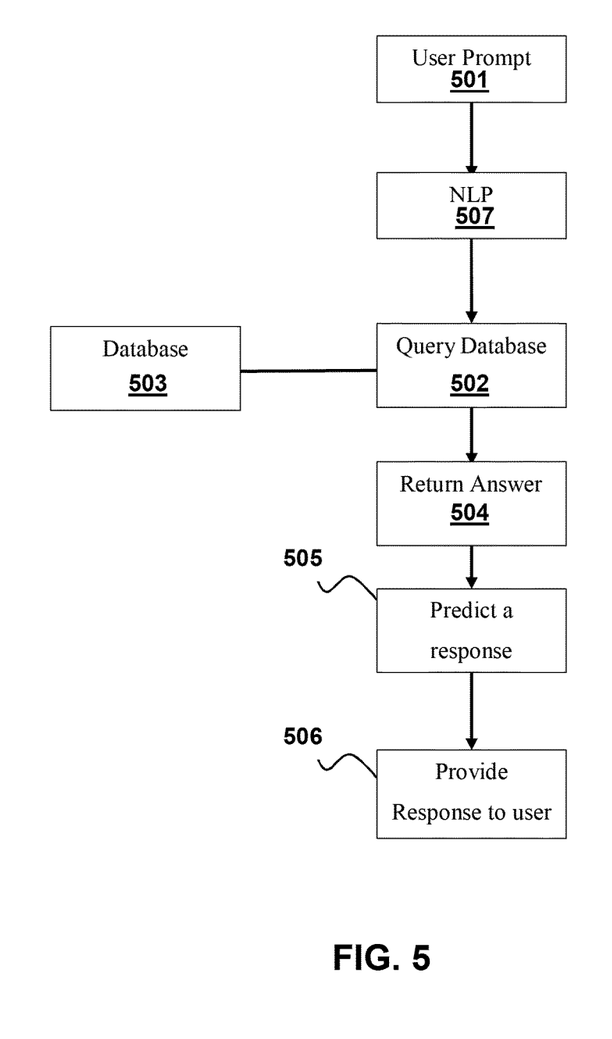

FIG. 5 is a flow diagram depicting a method of operation replicating a character with database search according to aspects of the present disclosure. Initially the user may enter a prompt 501 into the system. The prompt may be a text string that is for example and without limitation entered into a text box or some other field in the system. In an alternative implementation voice recognition may be used to convert a prompt voiced by a user into a text prompt. A prompt may be for example and without limitation a question or statement by the user intended to incite a response from the system. NLP 507 then evaluates the prompt. NLP tokenizes the prompt and performs some keyword recognition tasks on the prompt. Keywords detected by NLP may be used to query a database 502 the database 503 may then return a basic response based on the query 504. The basic response is then passed to the virtual assistant neural network where a response is predicted that replicates a response by the character based on the basic response from query 505. This predicted response is then provided to the user 506.

Figure 6:
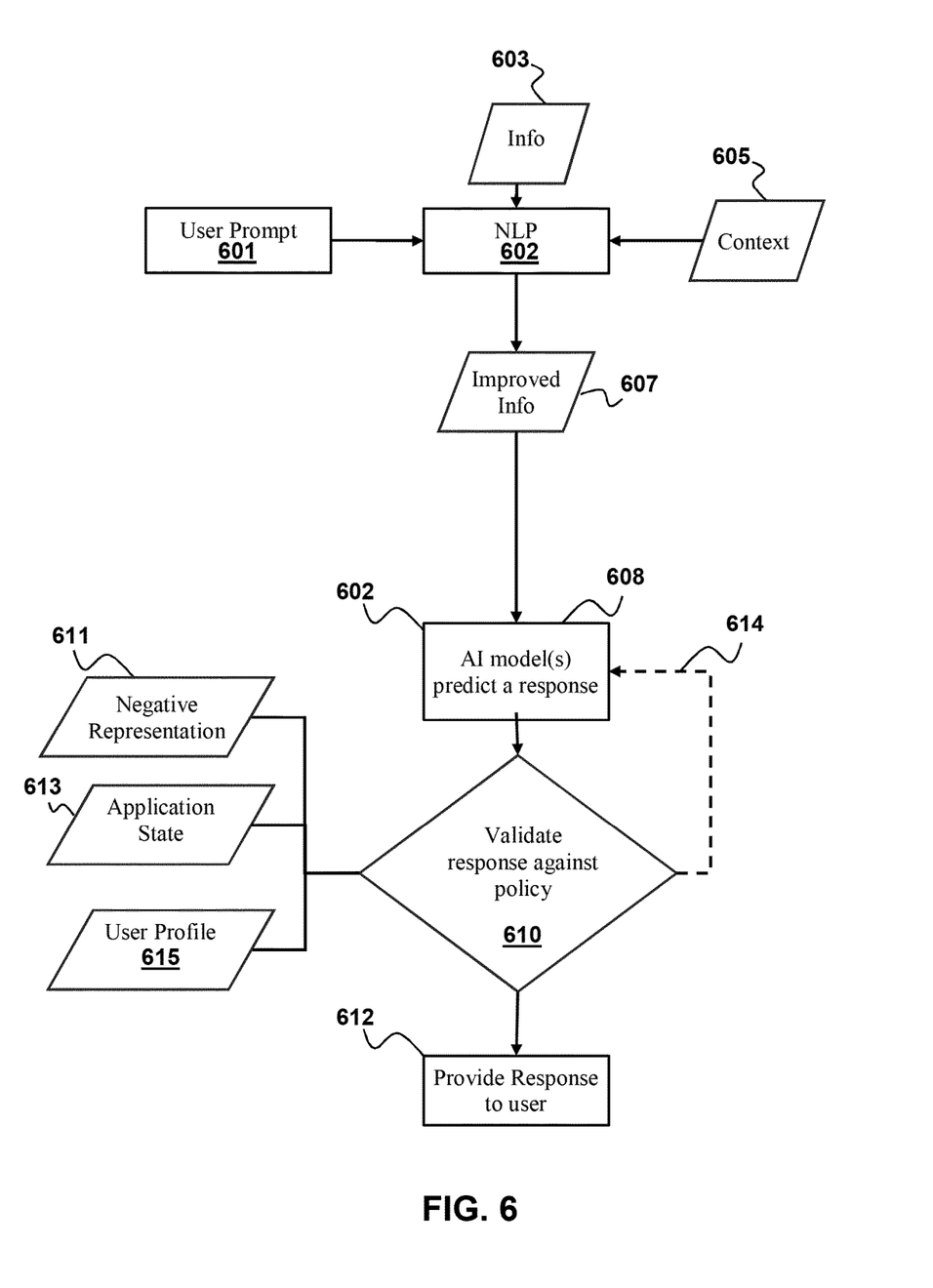
FIG. 6 is a flow diagram depicting a method of operation replicating a character according to aspects of the present disclosure.

FIG. 6 is a flow diagram depicting a method of operation replicating a character according to aspects of the present disclosure. In some implementations the application may be a storefront application such as the Google play store, PlayStation store, Xbox store etc. In these implementations statements of the character may be especially problematic as they may have incorrect statements or promises may have legal implications. The legal representation module thus may prevent the virtual assistant from producing a response that is legally problematic, includes spoilers or is inappropriate.

Initially the user may enter a prompt 601 into the system. The prompt may be a text string that is for example and without limitation entered into a text box or some other field in the system. In an alternative implementation voice recognition may be used to convert a prompt voiced by a user into a text prompt. A prompt may be for example and without limitation a question or statement by the user intended to incite a response from the system. NLP 602 then evaluates the prompt. NLP tokenizes the prompt and performs some keyword recognition tasks on the prompt. The virtual assistant Neural Network may then use the tokenized prompt to predict a response 602 that replicates a response from a character. For example, the NLP logic may fetch relevant information 603 from a knowledge base and improve the information using game context 605, e.g., what equipment the player has, where the player is in the game world, the player's active quest, etc. The resulting improved information 607 may be sent to one or more AI models, e.g., LLM or GPT models to generate a response, as indicated at 608. The response may then be validated against policy at 610 before sending the validated response to the player at 612. In some implementations, validation of the response may include evaluation by a negative representation module for a negative representation 611. A negative representation may be for example and without limitation a response that is false, misleading, inappropriate, and/or contains spoilers. The negative representation module may include a neural network trained with a machine learning algorithm to recognize statements that are negative representations. Additionally the negative representation module may be receive application state information 613 which may be used to determine if a response is spoiler as the response includes one or more keywords or phrases that have not been revealed to the player at their current application state. In some implementations the negative representation module may also receive user profile information 615 which may be used to determine if the user has reached farther than the current application state or has settings that allows application information to be spoiled. In some implementations if the response is found to contain a negative representation then the virtual assistant Neural Network may regenerate the response at 614 based on the prompt. In some alternative implementations the response may be replaced with a canned response instead of the generated response. The canned response may be related to the negative representation and/or may be chosen from a table of canned response. For example and without limitation, if the response is a spoiler the canned response may be "no spoilers" and if the response is inappropriate the canned response may be "I'm sorry but I don't know anything about that." Once a response has been checked for negative representations and no negative representation is found in the response, it may be passed to the user at 612.

Generalized Neural Network Training

The Neural Networks (NN)s in the virtual assistant discussed above may include one or more of several different types of neural networks and may have many different layers. By way of example and not by way of limitation the neural network may consist of one or multiple convolutional neural networks (CNN), recurrent neural networks (RNN), dynamic neural networks (DNN) and/or Generative Pre-trained Transformers (GPT). Many of the neural network described herein may be trained using the general training method disclosed herein. For more information regarding Generative Pre-trained transformers and their training, see Ashis Vaswaui et al. "*Attention Is All You Need*". arXiv: 1706.03762 (Dec. 5, 2017), which is incorporated herein by reference.

Figure 7A:
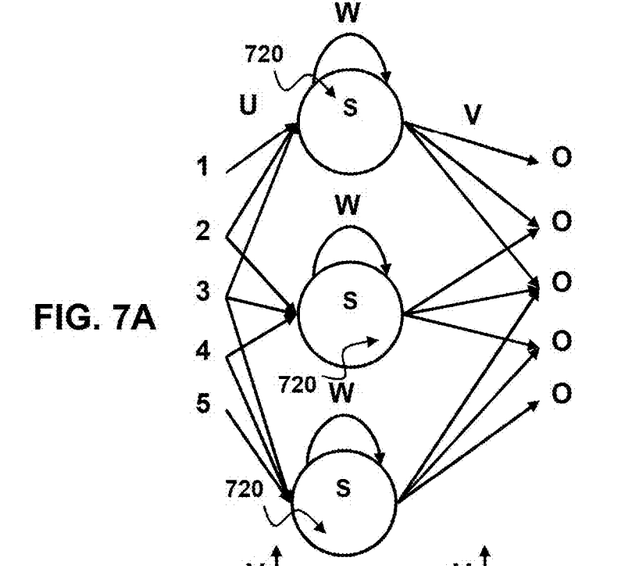
FIG. 7A is a simplified node diagram of a recurrent neural network according to aspects of the present disclosure.
Figure 7B:
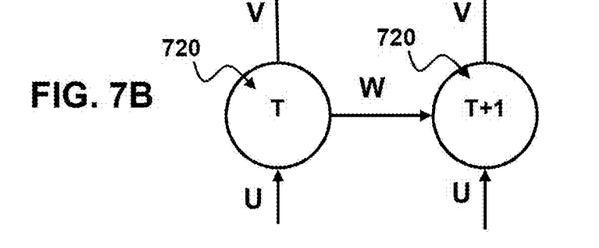
FIG. 7B is a simplified node diagram of an unfolded recurrent neural network according to aspects of the present disclosure.

By way of example, and not limitation, FIG. 7A depicts the basic form of an RNN that may be used, e.g., in the trained model. In the illustrated example, the RNN has a layer of nodes 720, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 7B, the RNN may be considered as a series of nodes 720 having the same activation function moving through time T and T+1. Thus, the RNN maintains historical information by feeding the result from a previous time T to a current time T+1.

In some implementations, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

Figure 7C:
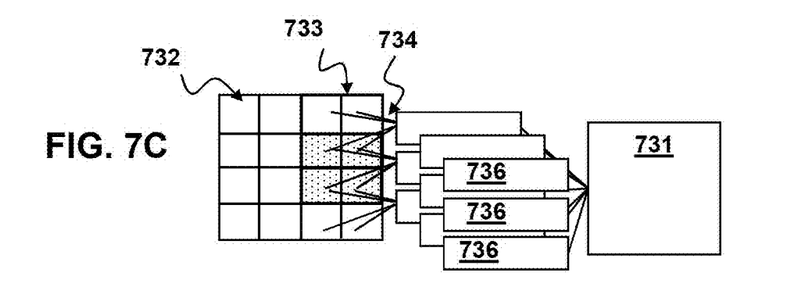
FIG. 7C is a simplified diagram of a convolutional neural network according to aspects of the present disclosure.

FIG. 7C depicts an example layout of a convolution neural network such as a convolutional recurrent neural network (CRNN), which may be used, e.g., in the trained model according to aspects of the present disclosure. In this depiction, the convolution neural network is generated for an input 732 with a size of 4 units in height and 4 units in width giving a total area of 16 units. The depicted convolutional neural network has a filter 733 size of 2 units in height and 2 units in width with a skip value of 1 and a channel 736 of size 9. For clarity in FIG. 7C only the connections 734 between the first column of channels and their filter windows are depicted. Aspects of the present disclosure, however, are not limited to such implementations. According to aspects of the present disclosure, the convolutional neural network may have any number of additional neural network node layers 731 and may include such layer types as additional convolutional layers, fully connected layers, pooling layers, max pooling layers, local contrast normalization layers, etc. of any size.

Figure 7D:
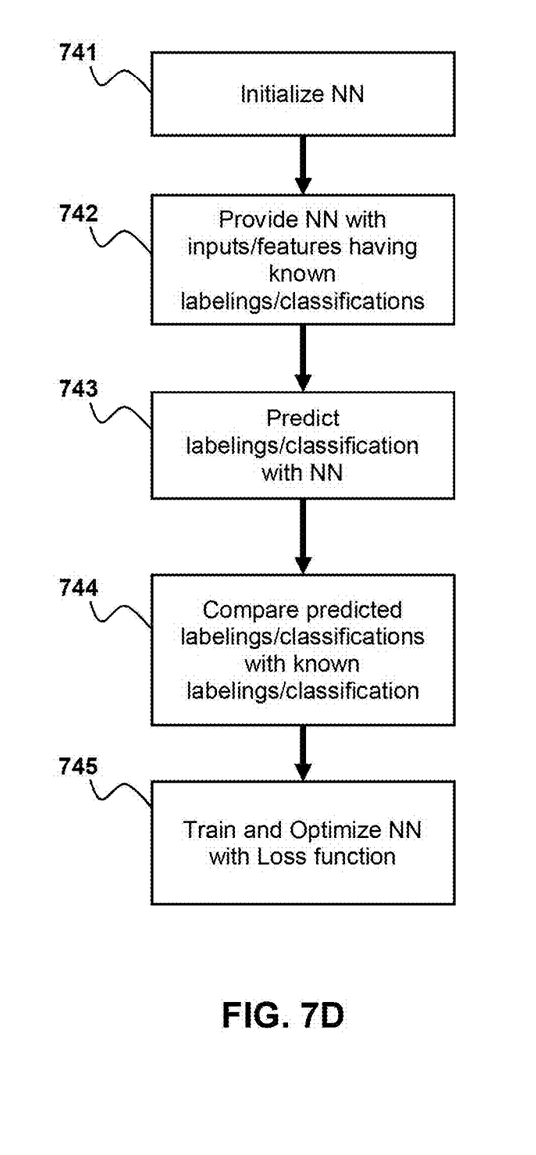
FIG. 7D is a flow diagram of a method for training a neural network according to aspects of the present disclosure.

As seen in FIG. 7D Training a NN begins with initialization of the weights of the NN at 741. In general, the initial weights should be distributed randomly. For example, an NN with a tanh activation function should have random values distributed between $$-\frac{1}{\sqrt{n}} \text{ and } \frac{1}{\sqrt{n}}$$

and where n is the number of inputs to the node.

After initialization, the activation function and optimizer are defined. The NN is then provided with a feature vector or input dataset at 742. Each of the different feature vectors that are generated with a unimodal NN may be provided with inputs that have known labels. Similarly, the multimodal NN may be provided with feature vectors that correspond to inputs having known labeling or classification. The NN then predicts a label or classification for the feature or input at 743. The predicted label or class is compared to the known label or class (also known as ground truth) and a loss function measures the total error between the predictions and ground truth over all the training samples at 744. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function, and using known methods of training for neural networks such as backpropagation with adaptive gradient descent etc., as indicated at 745. In each training epoch, the optimizer tries to choose the model parameters (i.e., weights) that minimize the training loss function (i.e., total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped, and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification. While the above discussion is in relation to RNNs and CRNNs the discussions may be applied to NNs that do not include Recurrent or hidden layers.

System

Figure 8:
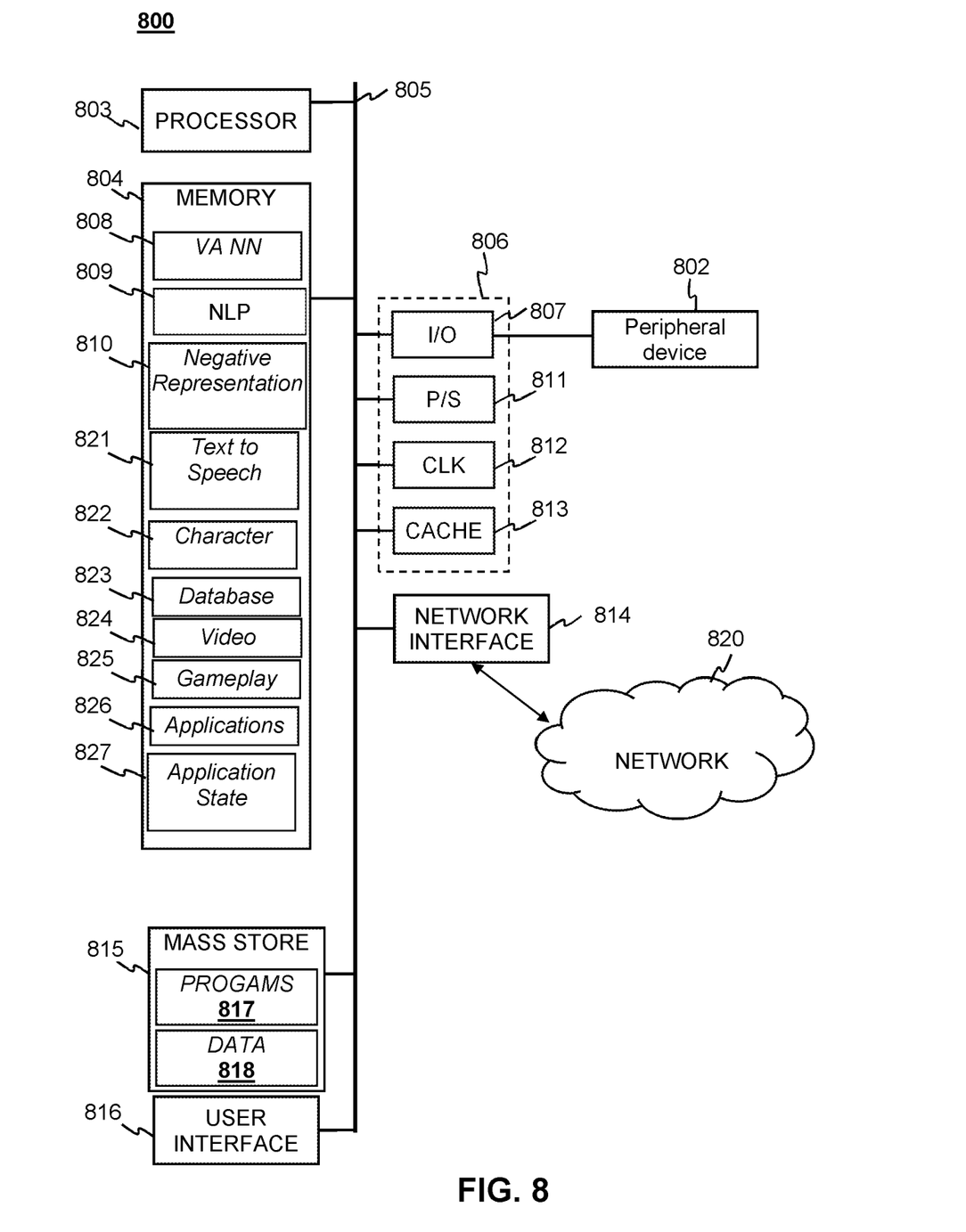
FIG. 8 is a block diagram of a system implementing a virtual assistant according to aspects of the present disclosure.

FIG. 8 depicts a system according to aspects of the present disclosure. The system may include a computing device 800 coupled to a user peripheral device 802. The peripheral device 802 may be a controller, touch screen, microphone or other device that allows the user to input speech data into the system. Additionally, the peripheral device 802 may also include one or more Inertial Measurement Units (IMU)s.

The computing device 800 may include one or more processor units 803, which may include one or more central processing units (CPU) and/or one or more graphical processing units, which may be configured according to well-known architectures, such as, e.g., single-core, dual-core, quad-core, multi-core, processor-coprocessor, cell processor, and the like. The computing device may also include one or more memory units 804 (e.g., random access memory (RAM), dynamic random-access memory (DRAM), read-only memory (ROM), and the like).

The processor unit(s) 803 may execute one or more programs, portions of which may be stored in memory 804 and the processor unit 803 may be operatively coupled to the memory, e.g., by accessing the memory via a data bus 805. The programs may be configured to implement training of the virtual assistant Neural Network (VA NN) 808 and/or one or more other NNs part of the other software modules such as the text to speech module 821, NLP module 821, gameplay module 825, and/or character module 822. Additionally, Memory 804 may contain one or more applications 826 which may generate application state data 827 that may be used with the virtual assistant. Memory 804 may also contain software modules that make up the virtual assistant such as a virtual assistant neural network (VA NN) module 808, and negative representation module 810, text to speech module 821, NLP module 821, character module 822, video module 824 and gameplay module 825. The VA NN module 808 and other modules are components virtual assistant such as the one depicted in FIG. 1 and FIG. 2. The memory 804 may also include one or more databases 823 that may include information about the one or more applications 826 and may searched with keywords detect by the NLP module from a prompt entered by a user. The overall structure and probabilities of the neural networks may also be stored as data 818 in a mass store 815. The processor unit 803 is further configured to execute one or more programs 817 stored in the mass store 815 or in memory 804 which cause the processor to carry out a method for training a NN from a corpus of character information and/or application information. The system may generate Neural Networks as part of the NN training process. These Neural Networks may be stored in memory 804 as part of the VA NN Module 808, or other software modules. Completed NNs may be stored in memory 804 or as data 818 in the mass store 815.

The computing device 800 may also include well-known support circuits, such as input/output (I/O) 807, circuits, power supplies (P/S) 811, a clock (CLK) 812, and cache 813, which may communicate with other components of the system, e.g., via the data bus 805. The computing device may include a network interface 814. The processor unit 803 and network interface 814 may be configured to implement a local area network (LAN) or personal area network (PAN), via a suitable network protocol, e.g., Bluetooth, for a PAN. The computing device may optionally include a mass storage device 815 such as a disk drive, CD-ROM drive, tape drive, flash memory, or the like, and the mass storage device may store programs and/or data. The computing device may also include a user interface 816 to facilitate interaction between the system and a user. The user interface may include a keyboard, mouse, light pen, game control pad, touch interface, or other device.

The computing device 800 may include a network interface 814 to facilitate communication via an electronic communications network 820. The network interface 814 may be configured to implement wired or wireless communication over local area networks and wide area networks such as the Internet. The device 800 may send and receive data and/or requests for files via one or more message packets over the network 820. Message packets sent over the network 820 may temporarily be stored in a buffer in memory 804.

Aspects of the present disclosure allow the creation of a virtual assistant that adopts the persona of a character that may be recognized by a user. Additionally, the virtual assistant may be integrated with an application allowing the character simulated by the virtual assistant to respond to questions about the application and even operate the application with the user. This may provide users with an interesting experience while also assisting the user with the operation of the application or responding to prompts.

While the above is a complete description of the preferred implementation of the present disclosure, it is possible to use various alternatives, modifications, and equivalents. Therefore, the scope of the present disclosure should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A," or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A device for providing a specialized agent comprising;
a video game application; and
a virtual assistant configured to predict a response to a question about the video game application received by the device, wherein the virtual assistant comprises a neural network trained with a machine learning algorithm to emulate a communication style of a video game character associated the video game application, and wherein the virtual assistant is further configured to validate the response based on whether the response includes a video game spoiler.

2. The device of claim 1, wherein the virtual assistant further comprises a natural language processing module operable to convert language input into a computer readable form.

3. The device of claim 1, wherein the virtual assistant further comprises a text to speech module operable to convert text responses from the virtual assistant to speech.

4. The device of claim 3, wherein the text to speech module includes a speech neural network trained with a machine learning algorithm to replicate a speech style of a character.

5. The device of claim 4, wherein the speech neural network is trained to replicate the speech style by replicating one or more of a group of intonation, speed, pronunciation, and prosody.

6. The device of claim 3, wherein the text to speech module includes a speech neural network trained with a machine learning algorithm on voice recordings.

7. The device of claim 1, wherein the virtual assistant further comprises a gameplay module, wherein the gameplay module is operable to operate the video game application.

8. The device of claim 7, wherein the video game application is operable to allow the gameplay module to operate in tandem with a user.

9. The device of claim 7, wherein the video game application is configured to enable cooperative game and the gameplay module is operable to play cooperatively with a user.

10. The device of claim 7, wherein the gameplay module includes a neural network trained with a machine learning to operate the video game application.

11. The device of claim 1, the virtual assistant further comprises a negative representation module operable to detect that the response comprises a negative representation, wherein the negative representation comprises false information, misleading information, inappropriate information, or a combination thereof, and to remove the negative representation upon detecting the negative representation.

12. The device of claim 11, wherein the negative representation module includes a representation neural network trained with a machine learning algorithm configured to detect the negative representation.

13. The device of claim 11, wherein the negative representation module includes a representation neural network trained with a machine learning algorithm configured to detect that the response comprises the video game spoiler, wherein the video game spoiler comprises information for a part of the video game application a user has not seen yet.

14. The device claim 1, wherein the virtual assistant further comprises a character module wherein the character module is operable to coordinate a visual display of the video game character with the response to question.

15. The device of claim 1, wherein the virtual assistant further comprises a video module, wherein the video module is operable to retrieve a video based on the response.

16. The device of claim 1, wherein the virtual assistant further comprises a video module, wherein the video module is operable to overlay video and/or text and/or graphic content on top of image frames of the application.

17. A system for providing a specialized agent comprising:
a processor;
a memory coupled to the processor;
non-transitory processor executable instructions embodied in the memory that when executed by the processor causes the processor to carry out a method comprising:
executing a video game application; and
providing a response to a question from a user about the video game application, wherein the response is generated by a virtual assistant, wherein the virtual assistant comprises a neural network trained with a machine learning algorithm to emulate a communication style of a video game character associated with the video game application and, wherein providing the response comprises validating the response based on whether the response includes a video game spoiler.

18. The system of claim 17, wherein the non-transitory processor executable instructions further include converting the question from a non-computer readable format to a computer readable format with a natural language processing neural network wherein the natural language processing neural network is communicatively coupled with the virtual assistant.

19. The system of claim 17, wherein the non-transitory processor executable instructions further include one or more instructions that when executed by the processor causes the processor to convert the response to the question from the user to speech using a text to speech module.

20. The system of claim 19, wherein the text to speech module includes a speech neural network trained with a machine learning algorithm to replicate a speech style of a character.

21. The system of claim 20, wherein the speech neural network is trained to replicate the speech style of the character by replicating one or more of a group of intonation, speed, pronunciation, and prosody.

22. The system of claim 20, wherein the speech neural network trained is with a machine learning algorithm using voice recordings.

23. The system of claim 17, wherein the non-transitory processor executable instructions further include one or more instructions that when executed by the processor causes the processor to operate the video game application to provide the response to the question from the user using a gameplay module.

24. The system of claim 23, wherein the video game application is operable to allow the gameplay module to operate in tandem with the user.

25. A method comprising:

executing a video game application; and providing a response to a question from a user about the video game application, wherein the response is generated by a virtual assistant comprising a neural network trained with a machine learning algorithm to emulate a communication style of a video game character associated with the video game application, and wherein providing the response comprises validating the response based on whether the response includes, a video game spoiler.

* * * * *